2,754,218
PRINTING INK

William A. Magie II, Winnetka, Ill.

No Drawing. Application April 27, 1953,
Serial No. 351,501

13 Claims. (Cl. 106—22)

This invention relates to a printing ink.

This application is a continuation-in-part of my co-pending application Serial No. 133,943, filed December 19, 1949, and now abandoned.

One of the objects of this invention is to provide a printing ink comprising a mineral oil, water, a coloring ingredient which may be either a water soluble dye or an insoluble coloring pigment and either an alkali metal or an alkaline earth metal alkylaryl sulfonate present in an amount of at least about 15% by weight of the ink.

Another object of the invention is to provide such an ink which may contain a hydrocarbon solvent and in which the ingredients including the relatively large amount of sulfonate may be varied to control the amount of strike and the drying time to any desired values and in which the ink dries rapidly without requiring heat.

In the preferred printing ink of this invention the product comprises from about 15 to 50% by weight of an alkali metal or an alkaline earth metal alkylaryl sulfonate, 0 to about 45% of hydrocarbon solvent, about 15 to 60% of a mineral oil, the total amounts of solvent and oil not exceeding about 60% by weight of the ink, about 5 to 50% water and a coloring ingredient which may be either a water soluble dye or a coloring pigment. The preferred sulfonate has a molecular weight of about 375 to 1000 and the alkyl portion of the sulfonate preferably contains from about 2 to 18 carbon atoms. Furthermore, the solvent preferably has a viscosity of less than 45 seconds Saybolt at 100° F. and the oil preferably has a viscosity of more than 45 seconds Saybolt at 100° F.

The printing inks of this invention have many advantages not possessed by prior inks. Thus, the prior printing inks were ordinarily made from pigments, drying or nondrying oils, and solvents for controlling viscosity and drying time. These pigments ordinarily included finely divided minerals or carbon blacks that were usually ground to the proper fineness for dispersion in the ink.

With these prior inks it was found that for any given formulation the use of varying small amounts of a required dispersing wetting agent tended to cause great variation in the final product. Furthermore, these wetting agents had to be used very carefully as very small excesses cause the ink to strike too deeply into the paper and spread too rapidly thereby causing complete penetration thru the paper and feathering. These deficiencies were noted even when the wetting and dispersing agent was a mahogany soap which, of course, is an inorganic salt of an alkylaryl sulfonic acid.

The inks of this invention successfully overcome the above difficulties in compounding a useful printing ink and even though alkylaryl sulfonates are employed the inks may be much more closely controlled as to drying, penetrating and wetting properties and a suitable ink for any given use can be readily compounded by one skilled in the art to produce any desired final characteristics. Thus, in the printing inks of the present invention the solvents are not used in small quantities as wetting or dispersing agents for the insoluble ingredients including insoluble pigments, but are used in much greater quantities than that heretofore thought possible to control the viscosity of the ink as well as other characteristics. Thus, by using a sulfonate of the proper mean molecular weight with varying amounts of water, it was found that the viscosity of the resulting ink could be easily controlled to the value desired.

Furthermore, it was found that by using various types of mineral oil in the ink the viscosity of the ink can be varied at will. By the proper selection of sulfonate, mineral oil and solvent, where one is required, it is possible to make inks having any desired drying rate, strike characteristics, penetration and the like. However, in all cases the amount of sulfonate is relatively large compared to the amounts previously employed.

In compounding the inks of this invention including the ingredients as set out above, it was found that it is unnecessary to grind in commercially available carbon blacks or previously ground pigments in a portion of the vehicle as was previously necessary as with the inks of this invention only simple mechanical agitation was required. Furthermore, water soluble dyes can be used in these inks without any additional processing as it is merely necessary to add the dye either to the water ingredient or to the finished ink base. Furthermore, with the inks of this invention true mixed colors may be achieved with water soluble dyes and these colors have not been heretofore possible. For example, it is now possible to obtain a true jet black with water soluble dyes. In general, with the inks of this invention any color that is obtainable with water alone can also be obtained in the new inks.

The inks of this invention are all thixotropic and include mineral oil as a necessary ingredient. In many of the formulations the hydrocarbon solvent is also required where the viscosity desired is such as to warrant its use. Thus, the hydrocarbon solvent operates essentially as a thinner for either or both the oil and the sulfonate.

The preferred salt of the alkylaryl sulfonic acid is either an alkali metal or an alkaline earth metal salt of the acid. Among the preferred salts are the sodium, barium and calcium salts although the other members of the groups may be used. Those mentioned are preferred primarily for economic reasons.

The sulfonic acid used in making the sulfonates may be produced by treating either petroleum or coal tar with sulfuric acid in the customary manner. The acid is ordinarily either concentrated or fuming sulfuric acid. The sulfuric acid reacts with the alkyl substituted aromatic or aralkyl constituents of the petroleum or coal tar to form the alkylaryl sulfonic acid. These acids may be extracted from the petroleum or coal tar with an alcohol such as 60% ethyl or isopropyl alcohol. Some of the oil is retained in the alcohol so that further purification of the sulfonic acid is usually required. The alkylaryl sulfonic acids are strong acids and will form salts with metals. In preparing the inorganic salt, the sulfonic acid is preferably substantially neutralized with a metal compound to form the salt. Synthetic alkylaryl sulfonates may also be used. These are ordinarily made from a synthetic alkylaryl such as ethyl benzene, nonyl benzene, diethyl and triethyl benzenes, dinonyl and trinonyl benzenes as well as the corresponding naphthalenes.

The alkyl groups of the sulfonates have preferably from 2 to 18 carbon atoms and are either straight chain, branch chain or cyclic. The aryl portions of the molecules are either single ring or condensed ring structures and may be substituted or unsubstituted. Where substituted these substituents are preferably aliphatic.

The relatively large amount of alkylaryl sulfonate used in this invention serves to produce uniform true color in the ink when the coloring ingredient is added and permits controlling the amount of strike and the drying time without requiring heat. In general, the lower the moleucular weight of the alkylaryl sulfonic acid used in making the sulfonate, the greater the strike thru; the lower the initial boiling point of the solvent the greater the strike thru; the lower the viscosity of the mineral oil the greater the strike thru; the greater the quantity of water the greater the strike thru. Similarly, the higher the molecular weight of the acid the less strike thru and the greater the embossing effect. The higher the boiling point of the solvent the less strike thru; the higher the viscosity of the mineral oil the less strike thru and the lower the quantity of water the less strike thru and the greater the tendency to feathering. Thus, from these characteristics it is obvious that a proper combination to produce desired results can easily be made by one skilled in the art for a particular printing use.

The variation in molecular weight of the sulfonic acid as well as the kind of metal used to form the salt, varies the properties of the resulting ink. For example, the lower molecular weight acids produce shorter, more paste-like inks while the higher weight acids produce more fluid products. Furthermore, the alkali metal salts may be used to produce both water in oil and oil in water dispersions. A very important feature of the present inks is that they do not depend upon either the evaporation of solvents, the oxidation of drying oils or the heat setting of resins for the drying of the printing. With the new links the drying mechanism is controlled entirely by the strike. Thus, the drying is practically instantaneous and the amount of strike is easily controlled for use on different types of surfaces such as those of newsprint stock, bond, mimeograph stock, postcard stock and the like, and the inks may also be used in ball point pens, stamp pads and in other environments.

Another important advantage is that the new inks do not require the use of waxes or resins for enhancing luster and gloss. Furthermore, it is possible to get a lithographic effect with the new inks without producing a raised print surface. However, the waxes, resins or other usual compounding ingredients may be added to the new inks if such is desired.

The inks of this invention are water impervious if such is desired in spite of the fact that water soluble dyes may be used to produce the desired color. The brilliance of the colors used in the new inks is not reduced by incorporating them into the inks. This is completely contrary to previous inks as here the colors became somewhat dull as soon as they were incorporated into the vehicle. This appears to be true because the new inks do not require couplers in order to permit the incorporation of the water soluble dyes.

Although the mineral oil that is used may be selected from any of the viscosity ranges commercially available from the lightest lubricating fractions to the heaviest stocks, the preferred stock is one chosen from those commonly known as bright stocks. The preferred inks of this invention preferably contain the water dispersed in the oil rather than vice versa.

The inks of this invention do not harmfully bleed in water and have unusual brilliance of color. The different shades of color may also be carefully controlled by the proper choice of water-soluble dyes. One important feature of the new inks is that newspaper black inks made according to this invention may be bleached, which is not ordinarily possible with the conventional inks.

The alkylaryl sulfonic acid salts which may be used in this invention are oil soluble and at least water dispersible. Some of the salts of lower molecular weight are somewhat water-soluble. Even those of higher molecular weight, however, are water dispersible and when the ink containing water is made, there is no separation of phases and the ink will not freeze at ordinary freezing temperatures. The alkali metal salts of the alkylaryl sulfonic acids are preferred with the alkaline earth metal salts being next preferred. The average molecular weight of the alkylaryl sulfonic acids ordinarily used in this invention vary from about 375 to about 1000. These oil soluble sulfonic acids are known in the trade as mahogany acids as distinguished from green acids or water-soluble sulfonic acids. Although these alkylaryl sulfonic acids are readily obtained from the treatment of petroleum with sulfuric acid, as explained above, they may also be obtained from alkyl benzenes, alkyl naphthalenes, coal tars and the like with concentrated or fuming sulfuric acid.

Any of the usual water-soluble dyes may be used in the inks of this invention. These include rhodamine, Victoria blue, Victoria green, Auromine, Alphurazine-A, Methyl violet and Chrysodine yellow. In preparing the inks the dye may either be dissolved in the water and stirred into the salt of the sulfonic acid and the hydrocarbon solvent added, or the dye, the sulfonic acid, the solvent and the water may be mixed together. The mixture is stirred and preferably heated until a uniform liquid product is produced.

An inorganic salt of the sulfonic acid preferably contains from 0 to less than 15% retained or unreacted oil. However, 15% or more retained oil may be used in some cases. A particular sodium salt of an alkylaryl sulfonic acid with which excellent results have been achieved contains:

| | |
|---|---|
| Sodium salt of alkylaryl sulfonic acid | 75% minimum. |
| Unreacted oil | 15% maximum. |
| Water | 10% maximum. |
| Alkalinity (Na$_2$O) | 0.03%. |
| Color | Reddish brown. |
| Specific gravity | 1.04–1.07. |
| Pounds per gallon | 8.8. |
| Molecular weight of the dry oil-free sulfonate | 510 approximately. |
| Surface tension at 20° C., 0.1% in distilled water | About 39.2 dynes. |
| Surface tension at 20° C., 1.0% in distilled water | About 34.7 dynes. |
| Surface tension at 70° C., 0.1% in distilled water | About 33.9 dynes. |
| Surface tension at 70° C., 1.0% in distilled water | About 31.9 dynes. |

A typical example of an ink employing the above sodium salt is as follows:

*Example 1*

| | Percent |
|---|---|
| Sodium salt of sulfonated hydrocarbon oil | 30 |
| Water | 23 |
| Xylene | 45 |
| Dye | 2 |

Other examples of printing inks prepared according to this invention are as follows:

*Example 2*

| | Percent |
|---|---|
| Barium salt of sulfonated hydrocarbon oil | 35 |
| Mineral oil fraction boiling from 460° F. to 510° F. | 35 |
| Water | 25 |
| Dye (rhodamine) | 5 |

*Example 3*

| | Percent |
|---|---|
| Sodium salt of sulfonated hydrocarbon oil | 40 |
| Water | 40 |
| Mineral oil fraction boiling at 550–650° F. | 17 |
| Methyl violet crystals | 1.2 |
| Victoria green crystals | 0.6 |
| Chrysodine yellow powder | 1.2 |

The three dyes of Example 3 combine to make a black ink.

When a petroleum fraction is employed as a solvent, the preferred fraction is one boiling between about 175 and 680° F. Petroleum fractions boiling below or above this range may be employed depending upon the particular use of the ink.

In some instances a product will be marketed containing only the salt of the sulfonic acid, water and the dye. When this is done, the user may add the mineral oil or hydrocarbon solvent or both to make the ink. The user may also add any clays, resins, rosin, extenders or the like, or mixture thereof.

The following examples illustrate the preparation of ink bases to which the color that is desired is added. Thus, where the coloring ingredient is a water soluble dye, this dye may be dissolved in the water and added or may be added to the finished formula. In the following formulas the mineral oil is identified not only by its origin but also by its viscosity in seconds Saybolt at 100° F. The viscosity of the finished ink is also given. All percentages are by weight.

*Example 4*

| | Percent |
|---|---|
| A sodium alkylaryl sulfonate (M. W. 450) | 21 |
| 100/100 Coastal Pale Oil | 28 |
| Water | 20 |
| Paraffinic solvent (I. B. P. 580°) | 31 |

Gardner mobilometer viscosity (GMV)—#2 disk– 60 gm. wt.–60 sec. @ 77° F. (2-60-60).

*Example 5*

| | Percent |
|---|---|
| A sodium alkylaryl sulfonate (M. W. 450) | 21 |
| 100/100 Coastal Pale Oil | 58 |
| Water | 21 |

GMV @ 77° F.—2-50-60.

*Example 6*

| | Percent |
|---|---|
| A sodium alkylaryl sulfonate (M. W. 410) | 21 |
| 100/100 Coastal Pale Oil | 53 |
| Water | 26 |

GMV @ 77° F.—2-100-100.

*Example 7*

| | Percent |
|---|---|
| A sodium alkylaryl sulfonate (M. W. 475) | 28 |
| 100/100 Coastal Pale Oil | 45 |
| Water | 27 |

GMV @ 77° F.—2-100-150.

*Example 8*

| | Percent |
|---|---|
| A sodium alkylaryl sulfonate (M. W. 650) | 41 |
| 2000/100 Coastal Red Oil | 31 |
| Water | 28 |

GMV @ 77° F.—2-100-300.

*Example 9*

| | Percent |
|---|---|
| A sodium alkylaryl sulfonate (M. W. 1000) | 36 |
| 2000/100 Coastal Red Oil | 25 |
| Water | 37.5 |
| Glycerine | 1.5 |

GMV @ 77° F.—2-100-175.

*Example 10*

| | Percent |
|---|---|
| A sodium alkylaryl sulfonate (M. W. 700) | 36 |
| 2000/100 Coastal Red Oil | 20 |
| 100/100 Coastal Pale Oil | 5 |
| Water | 37.5 |
| Glycerine | 1.5 |

GMV @ 77° F.—2-100-300.

*Example 11*

| | Percent |
|---|---|
| A calcium alkylaryl sulfonate (M. W. 900) | 28 |
| 100/100 Coastal Pale Oil | 41 |
| Paraffinic solvent (I. B. P. 570°) | 10 |
| Water | 21 |

GMV @ 77° F.—2-50-100.

*Example 12*

| | Percent |
|---|---|
| A barium alkylaryl sulfonate (M. W. 1100) | 35 |
| 2000/100 Coastal Red Oil | 33 |
| Xylol | 15 |
| Water | 17 |

GMV @ 77° F.—2-50-125.

*Example 13*

| | Percent |
|---|---|
| A basic barium alkylaryl sulfonate (M. W. 650) | 25 |
| 100/100 Coastal Pale Oil | 10 |
| 2000/100 Coastal Red Oil | 40 |
| Paraffinic solvent (I. B. P. 410° F.) | 10 |
| Water | 15 |

GMV @ 77° F.—2-100-200.

While the invention has been described herein in particular embodiments, it is to be understood that the invention is not limited thereby but is intended to include modifications and alternative compositions falling within the spirit and scope of the invention as defined in the appended claims.

I claim:

1. A printing ink comprising a mineral oil, water, a printing ink color and from about 15% to about 50%, by weight of the ink, of a member of the class consisting of an alkali metal alkylaryl sulfonate and an alkaline earth metal alkylaryl sulfonate.

2. A printing ink comprising from about 15% to about 50% of a member of the class consisting of an alkali metal alkylaryl sulfonate and an alkaline earth metal alkylaryl sulfonate, up to about 45% of a hydrocarbon solvent, from about 15% to about 60% of a mineral oil, the total amounts of solvent and oil not exceeding about 60%, from about 5 to about 50% of water, all said amounts being by weight of the ink, and a printing ink color.

3. The printing ink of claim 2 wherein the sulfonic acid of the sulfonate has a molecular weight of about 375–1000.

4. The printing ink of claim 2 wherein the alkyl portion of the sulfonate contains from about 2–18 carbon atoms.

5. The printing ink of claim 2 wherein said solvent has a viscosity less than 45 seconds Saybolt at 100° F. and said oil has a viscosity of more than 45 seconds Saybolt at 100° F.

6. The printing ink of claim 2 wherein said printing ink color is a water soluble dye.

7. The printing ink of claim 2 wherein said printing ink color is a coloring pigment.

8. A printing ink comprising from about 15% to about 50% of a member of the class consisting of an alkali metal alkylaryl sulfonate and an alkaline earth metal alkylaryl sulfonate, from about 15% to about 60% of a mineral oil, from about 5 to about 50% of water, all said amounts being by weight of the ink, and a printing ink color.

9. The printing ink of claim 8 wherein said printing ink color is a water soluble dye.

10. The printing ink of claim 8 wherein said printing ink color is a coloring pigment.

11. A printing ink comprising from about 15% to about 50% of a member of the class consisting of an alkali metal alkylaryl sulfonate and an alkaline earth metal alkylaryl sulfonate, the sulfonic acids of which have a molecular weight of from about 375 to about 1000 and having from about 2 to about 18 carbon atoms in the alkyl portion of the molecule, up to about 45% of a hydrocarbon solvent having a viscosity of less than about 45 seconds Saybolt at 100° F., from about 15% to about 60% of a mineral oil having a viscosity of more than about 45 seconds Saybolt at 100° F., the total amounts of solvent and oil not exceeding about 60%, from about 5 to about 50% of water, and from about 1.5% to about 6.0% of a printing ink color, all said weights being by weight of the ink.

12. The printing ink of claim 11 wherein said printing ink color is a water soluble dye.

13. The printing ink of claim 11 wherein said printing ink color is a coloring pigment.

References Cited in the file of this patent

UNITED STATES PATENTS

| | | |
|---|---|---|
| 1,524,872 | McLeod et al. | Feb. 3, 1925 |
| 1,848,077 | Hoffman | Mar. 1, 1932 |
| 2,138,836 | Brower | Dec. 6, 1938 |
| 2,155,861 | Hughes | Apr. 25, 1939 |
| 2,161,173 | Kyrides | June 6, 1939 |
| 2,306,863 | Bour | Dec. 29, 1942 |
| 2,427,921 | Pfaelzer | Sept. 23, 1947 |
| 2,454,700 | Holik | Nov. 23, 1948 |

FOREIGN PATENTS

| | | |
|---|---|---|
| 388,878 | Germany | Jan. 22, 1924 |

OTHER REFERENCES

Ellis: Printing Ink (1940), pages 118–250.